United States Patent
Boughton et al.

(10) Patent No.: US 9,497,724 B2
(45) Date of Patent: *Nov. 15, 2016

(54) ENHANCEMENT FOR POWER DOWN SEQUENCE

(71) Applicant: Continental Automotive Systems, Inc., Auburn Hills, MI (US)

(72) Inventors: Erick Boughton, Morton Grove, IL (US); Irina Shmagin, Palatine, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,204

(22) Filed: Aug. 31, 2015

(65) Prior Publication Data

US 2015/0373662 A1    Dec. 24, 2015

Related U.S. Application Data

(63) Continuation of application No. 13/356,915, filed on Jan. 24, 2012, now Pat. No. 9,161,327.

(51) Int. Cl.
| | |
|---|---|
| *H04W 4/00* | (2009.01) |
| *H04W 60/04* | (2009.01) |
| *H04W 60/06* | (2009.01) |
| *H04B 1/3822* | (2015.01) |
| *H04W 4/14* | (2009.01) |
| *H04W 52/02* | (2009.01) |
| *H04W 76/02* | (2009.01) |

(52) U.S. Cl.
CPC ......... *H04W 60/04* (2013.01); *H04B 1/3822* (2013.01); *H04W 4/14* (2013.01); *H04W 52/0254* (2013.01); *H04W 60/06* (2013.01); *H04W 76/028* (2013.01); *Y02B 60/50* (2013.01)

(58) Field of Classification Search
CPC ............................. H04W 60/06; Y02B 60/50
USPC ............................. 455/574, 435.1; 370/311
See application file for complete search history.

(56) References Cited

U.S. PATENT DOCUMENTS

| | | | | |
|---|---|---|---|---|
| 5,946,620 A | * | 8/1999 | Schultz ................. | H04W 60/00 455/433 |
| 7,130,667 B2 | * | 10/2006 | Jin ..................... | H04W 52/0277 455/343.2 |
| 2002/0094832 A1 | * | 7/2002 | Lee ........................ | H04W 60/06 455/522 |

(Continued)

*Primary Examiner* — Marcus Hammonds

(57) ABSTRACT

When a cellular telephone is powered down, it sends a power-down message to a network it was previously registered with. If the network does not send, or if the cellular telephone does not receive, an acknowledgement of the power-down message from the network, a status bit referred to as a flag is set (or reset) in a non-volatile memory device in the cellular telephone. The power-down sequence is concluded by the cellular telephone and, the cellular telephone is shut off or put into a reduced power consumption state. When the telephone is turned back on, i.e., returned to its previous state, the flag is evaluated or "tested" to see if it was set (or reset) during the course of powering down. The status or value of the flag when the phone is powered up is then used by the cellular telephone to determine whether it should make a network access request to a network the telephone was registered to, during the power-up operation in order to cause that cellular network to update its database regarding the whereabouts of the powered-up cellular telephone.

12 Claims, 4 Drawing Sheets

(56) References Cited

U.S. PATENT DOCUMENTS

2004/0203767 A1* 10/2004 Fraser ................ H04W 60/02
455/435.1
2013/0070674 A1* 3/2013 Lin ..................... H04W 60/06
370/328

* cited by examiner

ENHANCEMENT FOR POWER DOWN SEQUENCE

BACKGROUND

FIG. 1 depicts a prior art wireless communication system. The system 100 is comprised of a communications tower 102 at the top of which is an antenna 104. Radio frequency signals 106 emanate from, and are picked up by the antenna 104 in the course of providing two-way wireless communications to compatible communications devices, such as a conventional cellular telephone 108 in a motor vehicle 110 or which can be carried about by a person, not shown.

In FIG. 1, the cellular telephone 108 in the vehicle 110 provides both two-way voice communications to users of a motor vehicle 110 and telematics data services to the motor vehicle 110. A telematics data service is a wireless data connection between sensors located on a vehicle 110 and a service provider that monitors the state of such sensors via a connection provided by a cellular telephone or other compatible wireless communications network. The General Motors ON-STAR™ system is an example of a telematics data service.

The cellular telephone 108 maintains communication with a cellular network, not shown, by the radio frequency signals that are exchanged between the cellular radio 108 and the antenna 104 so long as the cellular radio 108 is within a geographic coverage area 110 or cell within which radio communications with a cellular radio 108 can be maintained.

When the cellular radio 108 is powered down, it sends a power-down or de-registration message 112 to a cellular network controller, not shown, via the tower 102 service the cell 110 within which the cellular telephone 108 is operating. When the cellular system receives the power-down or de-registration signal 112, the cellular system acknowledges the power-down message 112 by the transmission of an acknowledgment message or "ACK" message, which when received by the cellular telephone 108 notifies the telephone 108 that the power-down sequence was received by the network. On the other hand, it a response to a power down, de-registration message 112 is not received by the cellular telephone 108, it will subsequently power-up in an indeterminate state vis-a-vis the network. The network might not know whether the cellular telephone 108 is "present" on the system or within the cell 110 or otherwise reachable. Among other things, text messages transmitted to the telephone 108 while it was powered down (off) might be sent to the telephone 108 by the network without the network being able to determine whether the messages were actually received. A method and apparatus for avoiding the ambiguity and operating state when a cellular radio powers-down but does not receive an acknowledge signal from the network would be an improvement over the prior art.

BRIEF SUMMARY

In accordance with embodiments of the invention, when a cellular telephone is powered down, it sends a power-down message to a network it was previously registered with. If the network does not send, or if the cellular telephone does not receive, an acknowledgement of the power-down message from the network, a status bit referred to as a flag is set (or reset) in a non-volatile memory device in the cellular telephone. The power-down sequence is concluded by the cellular telephone and, the cellular telephone is shut off or put into a reduced power consumption state. When the telephone is turned back on, i.e., returned to its previous state, the flag is evaluated or "tested" to see if it was set (or reset) during the course of powering down. The status or value of the flag when the phone is powered up is then used by the cellular telephone to determine whether it should make a network access request to a network the telephone was registered to, during the power-up operation in order to cause that cellular network to update its database regarding the whereabouts of the powered-up cellular telephone.

DETAILED DESCRIPTION

Figure 1:
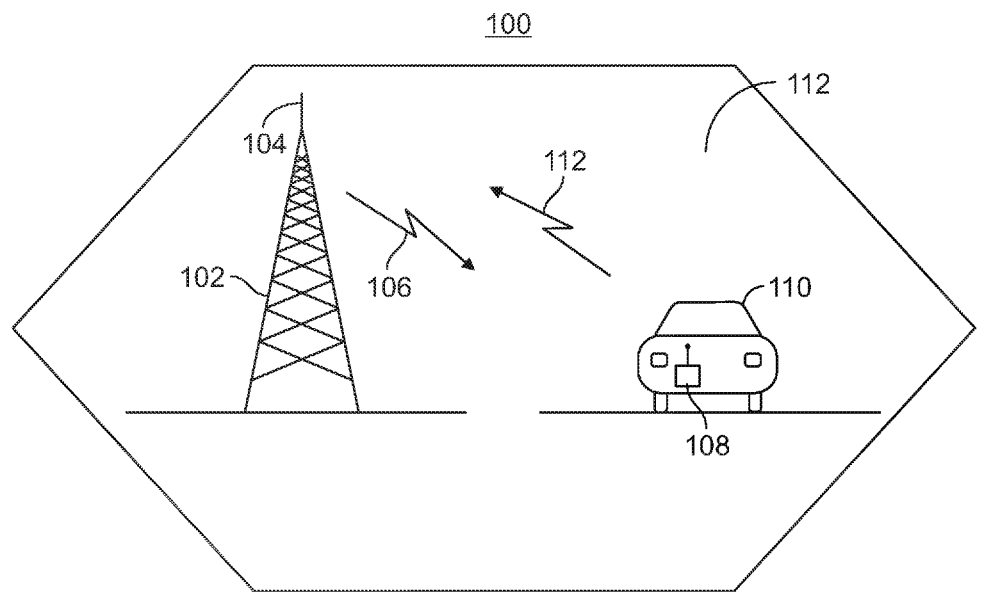
FIG. 1 depicts a prior art wireless communication system.
Figure 2:
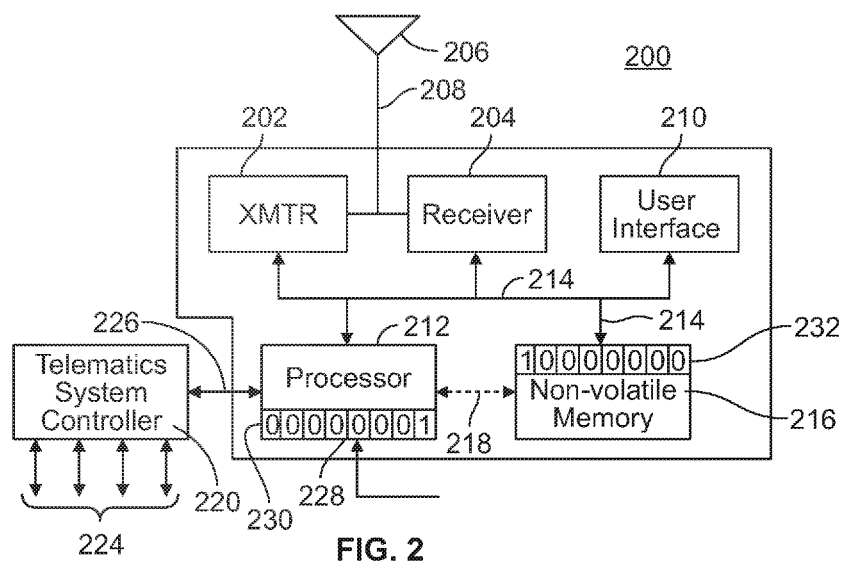
FIG. 2 is a block diagram of an apparatus for restoring wireless communications to a wireless communications device.

FIG. 2 is a block diagram of an apparatus 200 for restoring wireless communications to a wireless communications device, such as a cellular telephone, after the wireless communications device is powered-down. The apparatus 200 is comprised of a conventional, prior art wireless communications system transmitter 202 and a conventional prior art wireless communications system receiver 204. The transmitter 202 and the receiver 204 are both coupled to a conventional prior art antenna 206 through a conventional duplexer (not shown) to which is coupled a conventional transmission line 208.

A user interface 210 includes, but is not limited to, a conventional telephone handset, a speaker phone and a display device, through which a person can place and receive telephone calls and/or send and receive text and data messages via radio frequency signals sent to and received from a communication end point, such as a telematics service provider, another cell phone, or a data network. A communication end point is not shown in the figures for brevity.

The apparatus is also comprised of a processor 212, which is connected to and thereby controls at least the transmitter 202, the receiver 204, and the user interface 210 via a conventional prior art address, data and control bus 214. As used herein, the term "bus" refers to electrically parallel conductors or circuits that connect components of a computer system to each other and which allow the transfer of electric impulse energy from one connected component to another. The bus 214 thus connects the transmitter 202, receiver 204 and user interface 210 and the processor 212 inter-operatively to each other.

As shown in the figure, the bus 214 is also coupled between the processor 212 and a non-volatile memory device 216. In an alternate embodiment however, wherein the processor is part of a single-chip microcontroller or microprocessor, the processor 212 can be connected to the non-volatile memory device 216 via a separate bus 218 commonly found in single chip microcontrollers and microprocessors and which connects a central processing unit to a memory devices that are co-located with the CPU on the same silicone substrate.

A telematics system controller 220 embodied as a separate computer or processor, monitors the state of various vehicle sensors to which the telematics system controller 220 is connected by way of several different connections 224. Such sensors can include accelerometers or tilt sensors, collision or impact sensors, air bag deployment sensors and the like. If the telematics system controller 220 receives a signal from a monitored sensor, it is configured to direct the processor 212 of the apparatus 200, to cause the transmitter 202 to broadcast an appropriate notification message to a telematics service provider, not shown. Control signals provided to the processor 212 from the telematics system controller 220 are preferably carried over a separate bus 226 connected between the telematics system controller 220 and the processor 212.

In at least one alternate embodiment, the processor 212 is configured to perform the functionality of a separate telematics system controller 220. In such an embodiment, the processor 212 would have additional input/output ports or memory-mapped input/output ports that allow the processor 212 to monitor the state of various inputs and sensors.

In a preferred embodiment, the processor 212 is configured to receive a signal on an input port 228 the logical condition of which directs or causes the processors 212 to power-up or power-down the communication apparatus 200. Powering down the apparatus 200 occurs when a vehicle is shut-off in order to save power and reduce battery drain.

When a power-down signal is received by the processor 212, the processor 212 is configured to execute program instructions stored within it or the non-volatile memory 216, which when executed cause the processor 212 to execute an enhanced power-down sequence. When the apparatus 200 is powered up, the enhanced power-down sequence enables the apparatus 200 to be able to quickly determine whether a network that the apparatus 200 had been registered with, acknowledged the apparatus' state change from powered up to powered down.

Program instructions in one or more non-volatile memory devices, such as device 216, and which are coupled to the processor 200, when executed, cause the processor to effectuate the transmission of a conventional power-down or de-registration message, from the transmitter 202 to a wireless communication network with which communication between the apparatus 200 and such network had previously been established. After the power-down message is transmitted, additional program instructions cause the processor to enter a wait state or wait condition for a fixed and predetermined period of time during which the processor 212 continuously polls or scans the receiver 204 for receipt of an acknowledgement signal, also known as an "ACK" signal, sent from a wireless communications network, indicating to the apparatus 200 that the network received the power-down message and that the network will de-register the apparatus 200 from the network thus preventing the network from trying to route calls and messages to the apparatus after it has fully powered down.

The enhanced power-down sequence is comprised in part of program instructions in the non-volatile memory 216, which when executed, cause the processor 212 to set (or reset) one or more binary digits (bits) in a register 230 co-located on the substrate with the processor 212 or, set (or reset) one or more bits in one or more memory locations 232 in a non-volatile memory device 216. The setting or resetting of one or more binary digits is considered herein to be setting a "flag" the state of which is subsequently used in a power-up sequence to determine whether an acknowledgement of a power-down message was received by the apparatus 200. The flag is considered herein to be a network response message, status flag.

One or more binary digits are set or reset as the case may be if the receiver 204 does not detect the receipt of an acknowledgment by the wireless communication network to the de-registration message, which is also referred to herein after as a power-down registration message. If the power-down registration message is not received, it is likely because a network that the apparatus was registered to, did not receive or failed to process a power-down or de-registration message. The network will thus continue to treat the apparatus as if it is still powered up and operating.

Program instructions in the non-volatile memory device 216 control the processor 212 during its power-up sequence, causing the processor 212 to check the status of the network response message status flag to determine whether the previously transmitted power-down registration message was acknowledged by a network.

Figure 3:
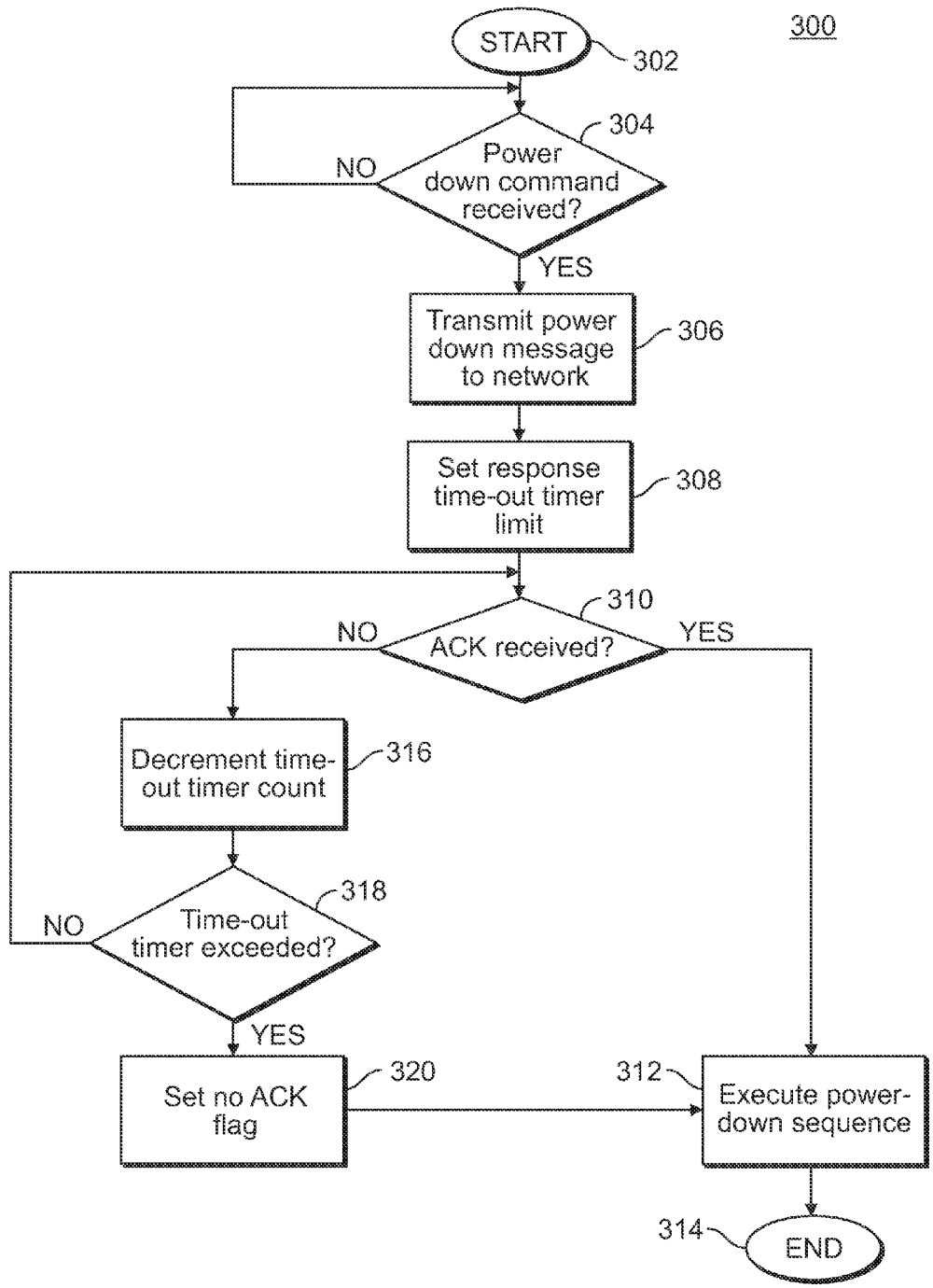
FIG. 3 is a flowchart of a part of a method of restoring wireless communications to a wireless communications device after the device has been powered down.

FIG. 3 is a flowchart of a part of a method 300 of restoring wireless communications to a wireless communications device after the device has been powered down. The method 300 can be performed by the apparatus in FIG. 2 and equivalents thereof.

At an initial step 302, the communications device or apparatus 200 is functioning normally and continues to do until a power-down message is input to the device, as happens when a user depresses a shut-down or power-off button on a conventional cell phone or a vehicle user turns off the vehicle's ignition. At step 304 a power-down command is received by the apparatus. After the power-down command is received at step 304 the method 300 proceeds to step 306 whereat a power-down or de-registration message is transmitted by the apparatus 200 to a network to which the apparatus 200 had been previously registered with. Once the power-down registration message is transmitted, the wireless device should receive an acknowledgement, albeit within a finite period of time that is typically established by network service providers but which can also be operationally programmed into the communications apparatus itself. It can also be programmed by the user or operator of the device.

Step 308 depicts the establishment of a network response message, time-out timer limit. The time-out timer limit can be specified by a service provider, a phone manufacturer or even an input by a user. Nevertheless, once a power-down registration message is transmitted at step 306, the wireless communications device or apparatus 200 should receive an acknowledgement (ACK) within a finite time thereafter. That time limit is depicted in FIG. 3 as being set at step 308.

Step 310 shows that if the acknowledgement response is received, the method 300 proceeds to step 312 where the wireless communications device completes the execution of its power-down sequence. The apparatus 200 then goes into a sleep, stand-by or complete shut-down mode at step 314, where it stays until the device is powered up.

If after sending the power-down registration message at step 306, an acknowledgement is not received immediately, the method 300 proceeds to step 316 where the time-out timer count value is decremented in a loop comprised of steps 310, 316 and 318. If the time-out timer value is exceeded, which means that no acknowledgement to the power-down registration has been received within the time period previously established, at step 318 the method proceeds to step 320 where the processor sets a network response message flag described above, which when set indicates to the apparatus upon power up that no acknowledgement message was received in response to the previously-executed power-down sequence. After the flag is set, the method 300 proceeds to finish its power down sequence at step 312.

Figure 4:
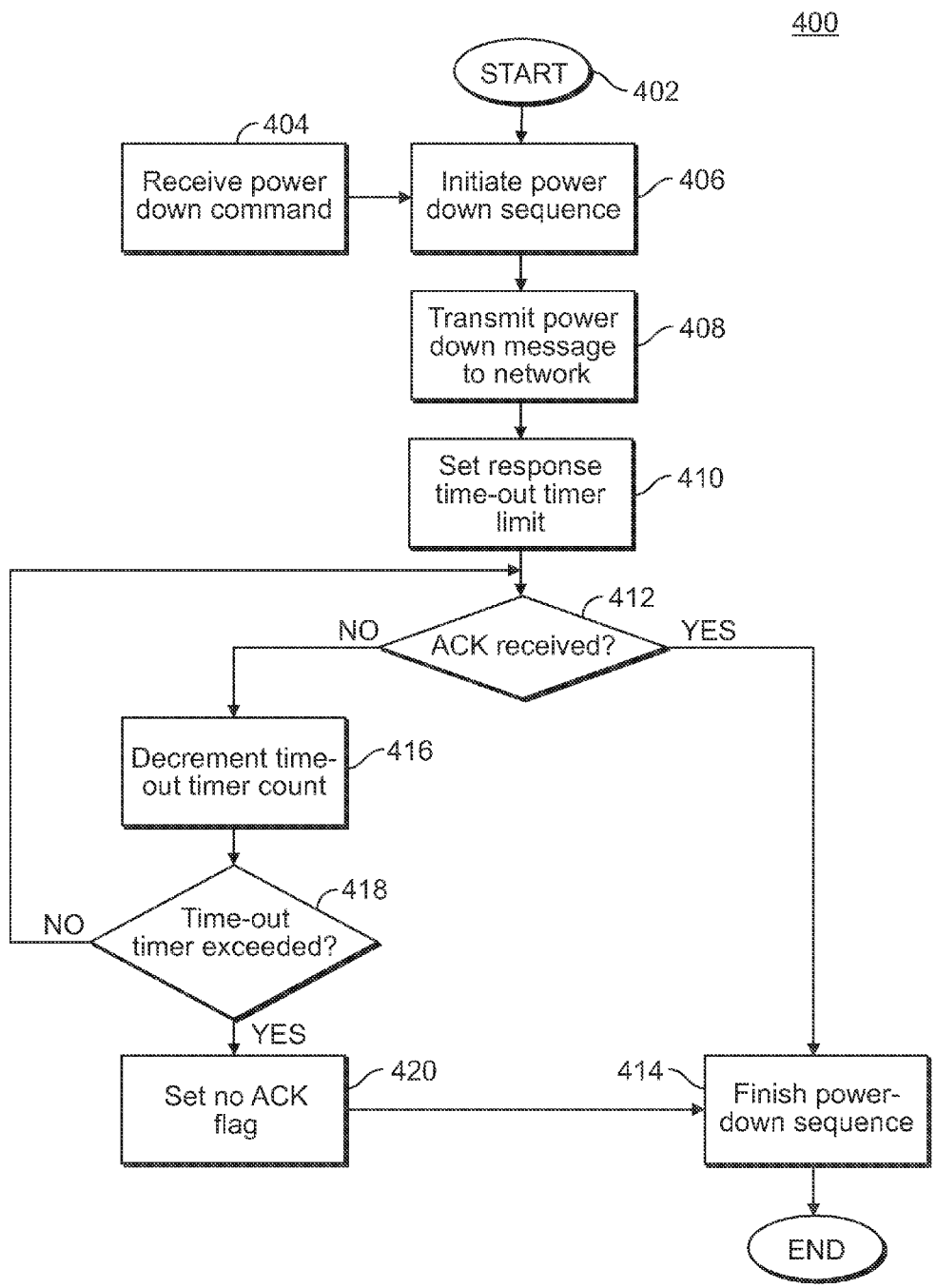
FIG. 4 depicts an alternate method of restoring wireless communication to a wireless communications device.

FIG. 4 depicts an alternate method 400 of restoring wireless communication to a wireless communications device or apparatus 200 after the apparatus has been sent a power-down command. From its normal operating mode 402, the apparatus 200 receives a power-down command at step 404, which causes the device or apparatus 200 to initiate its power-down sequence at 406. Near the end of the power-down sequence 406, but as a part of that sequence, a power-down, de-registration message is transmitted from a transmitter 202 at step 408. The method of FIG. 3 and method of FIG. 4 thus differ by whether the power-down registration message is sent before or after the initiation of the power-down sequence.

As with the method shown in FIG. 3, a response time-out timer limit is set at step 410. Thereafter, the method immediately checks for the reception of an acknowledgement at step 412. If a response is received, the method shown in FIG. 4 finishes the power-down sequence at step 414. If no acknowledgement is received, at 412 the time-out timer is decremented at step 416, checked for exhaustion at step 418 and if the time has exhausted or expired, and no acknowledgement has been received a no acknowledgement flag is set at step 420 and the power-down sequence concluded as before at step 414.

Setting a "flag" to indicate that a power-down ACK signal was not received enables a wireless communications device to quickly determine upon power up whether the a previously-transmitted power-down registration message was received. If the flag is set (or reset) a previously registered-to network might consider the device to have been registered with the network for the entire time that the apparatus 200 was powered down.

Figure 5:
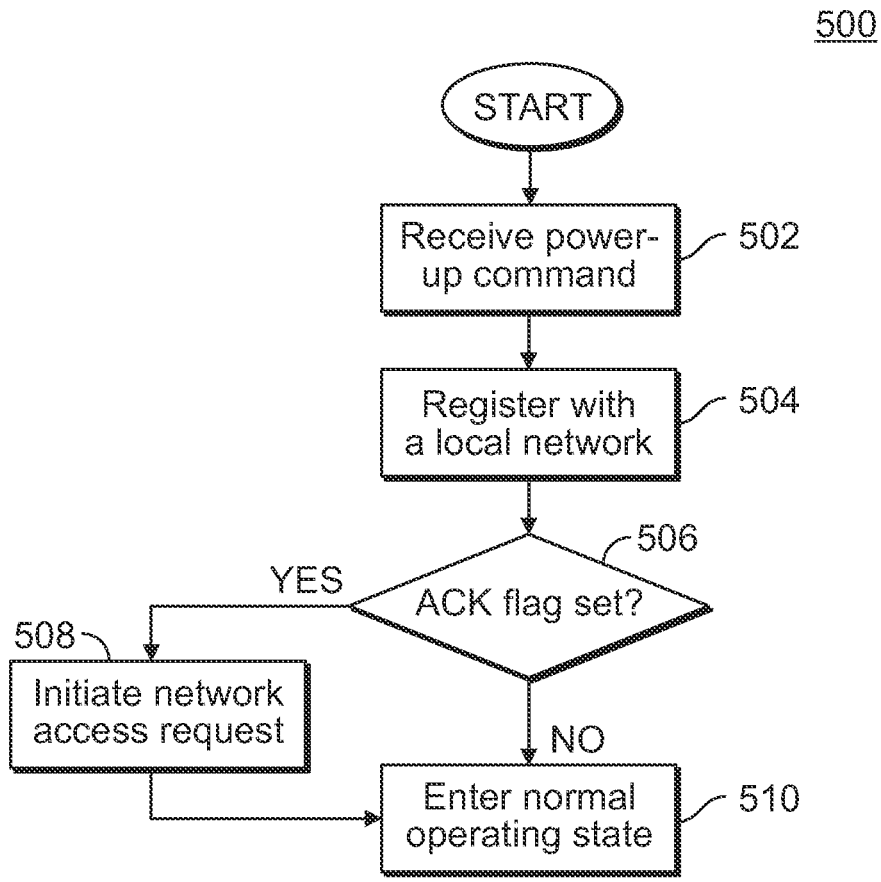
FIG. 5 is a power-up sequence.

Referring now to FIG. 5, a power-up sequence 500 is shown. When a power-up message or command is detected at step 502, as happens when a user presses the power-on button of his cellular telephone or the vehicle ignition is turned on, the device attempts to register with a local network in step 504 using conventional prior art techniques for registering a wireless communications device with a wireless communications network. At step 506, and after registration has been accomplished, the method 500 checks to determine whether the acknowledgement flag described above has been "set" indicating whether an acknowledgement to a previously-transmitted power-down registration message was received and acknowledged by the wireless network. If the flag is set, the wireless communications device thus knows that it needs to request a network access in order to notify the network of its existence. At step 508, the method initiates a method access request, such as requesting a voice channel, by which the registered-to network (step 504) becomes aware of the wireless communications device and notifies a home network of its existence. If the flag is not set as determined at step 506, the wireless communications device enters its normal operating state at step 510 as happens after the network access request is made at step 508.

Those of ordinary skill in the art to which the appurtenant claims are directed will recognize that a power-down state and a power-down sequence are device and system dependent. In some embodiments, a power-down state will be an operating state where power consumption is reduced by not zero. In other embodiments, a power-down state exists when no power is being consumed.

Those of ordinary skill in the art will recognize that the setting of a status bit or bits can be effectuated by setting one or more bits to either a logic 1 or a logic 0. A flag can also be embodied as more than one bit. Stated another way, the polarity of one or more binary digits in a memory device or a register that indicate either the reception of an ACK signal or the failure to receive an ACK signal, is a design choice. The bit or bits comprising a flag can be either a logic 1 or a logic 0.

The foregoing description is for purposes of illustration only. The true scope of the invention is set forth in the following claims.

The invention claimed is:

1. A method comprising:
   receiving a power-up command in response to a vehicle's ignition being turned on;
   registering a wireless communications device with a wireless communications network;
   determining whether a flag is set, wherein the flag being set indicates that the wireless communications device has not received an acknowledgement in response to a power down message that the wireless communications device previously sent to the network;
   when the flag is determined to be set, initiating a network access request to the network to notify the network that the wireless communications device is available prior to entering a normal operating mode;
   when the flag is determined to not be set, entering the normal operating mode without initiating the network access request.

2. The method of claim 1, wherein the step of determining whether the flag is set occurs prior to the step of registering with a local wireless communications network.

3. The method of claim 1, wherein the step of initiating a network access request comprises: transmitting a data packet.

4. The method of claim 3, wherein the step of transmitting a data packet comprises a short message service data packet.

5. The method of claim 1, wherein the step of initiating a network access request comprises: initiating a voice call.

6. The method of claim 1, wherein the step of setting a flag comprises: writing a binary value to a memory device.

7. The method of claim 1, wherein the step of receiving a power-up command occurs in response to a power-on button of a cellular telephone being pressed.

8. A wireless communications device comprising:
   a processor configured to:
   receive a power-up command in response to the vehicle's ignition being turned on;
   register the wireless communications device with a wireless communications network;
   determine whether a flag is set, wherein the flag being set indicates that the wireless communications device has not received an acknowledgement in response to a power down message that the wireless communications device previously sent to the network;
   when the flag is determined to be set, initiate a network access request to the network to notify the network that the wireless communications device is available prior to entering a normal operating mode;
   when the flag is determined to not be set, entering the normal operating mode without initiating the network access request.

9. The wireless communications device of claim 8, further comprising a memory device, operatively coupled to the processor and configured to store a signal representative of the flag.

10. The wireless communications device of claim 8, further comprising a telematics controller coupled to the processor and configured to reduce power consumption by a telematics system of a vehicle.

11. An apparatus comprising:
   a wireless communications device;
   a processor coupled to the wireless communications device and controlling the wireless communications device;
   a memory device coupled to the processor and containing program instructions, which, when executed, cause the wireless communications device to:
   receive a power-up command in response to the vehicle's ignition being turned on;
   register the wireless communications device with a wireless communications network;
   determine whether a flag is set, wherein the flag being set indicates that the wireless communications device has not received an acknowledgement in response to a power down message that the wireless communications device previously sent to the network;
   when the flag is determined to be set, initiate a network access request to the network to notify the network that the wireless communications device is available prior to entering a normal operating mode;
   when the flag is determined to not be set, entering the normal operating mode without initiating the network access request.

12. The apparatus of claim 11, further comprising a telematics controller coupled to the processor and configured to reduce power consumption by a telematics system of a vehicle.

* * * * *